(12) United States Patent
Kim et al.

(10) Patent No.: US 8,924,089 B2
(45) Date of Patent: Dec. 30, 2014

(54) AUTOMOBILE AND METHOD OF CONTROLLING AUTOMOBILE

(71) Applicant: Hyundai Mobis Co., Ltd, Yongin-si, Gyeonggi-do (KR)

(72) Inventors: Byung Su Kim, Seoul (KR); Dong Hyun Nam, Yongin-si (KR)

(73) Assignee: Hyundai Mobis Co., Ltd, Yongin-Si, Gyeonggi-Do (KR)

( * ) Notice: Subject to any disclaimer, the term of this patent is extended or adjusted under 35 U.S.C. 154(b) by 0 days.

(21) Appl. No.: 13/908,142

(22) Filed: Jun. 3, 2013

(65) Prior Publication Data
US 2014/0149001 A1    May 29, 2014

(30) Foreign Application Priority Data

Nov. 27, 2012 (KR) .................. 10-2012-0135540
Dec. 26, 2012 (KR) .................. 10-2012-0153440

(51) Int. Cl.
*B60R 21/0136*    (2006.01)

(52) U.S. Cl.
CPC ............................. *B60R 21/0136* (2013.01)
USPC .............................................. 701/46; 701/45

(58) Field of Classification Search
USPC .................... 701/45, 46, 48; 180/275, 271
See application file for complete search history.

(56) References Cited

U.S. PATENT DOCUMENTS

| | | | |
|---|---|---|---|
| 6,452,535 B1* | 9/2002 | Rao et al. | 342/72 |
| 2007/0276565 A1* | 11/2007 | Kuttenberger et al. | 701/45 |
| 2008/0269991 A1* | 10/2008 | Yamashita | 701/45 |
| 2009/0038873 A1* | 2/2009 | Lucas et al. | 180/275 |
| 2009/0299576 A1* | 12/2009 | Baumann et al. | 701/45 |
| 2013/0110368 A1* | 5/2013 | Zagorski | 701/70 |
| 2013/0181860 A1* | 7/2013 | Le et al. | 342/72 |
| 2014/0136044 A1* | 5/2014 | Conrad | 701/23 |

FOREIGN PATENT DOCUMENTS

| | | |
|---|---|---|
| JP | H11-105666 | 4/1999 |
| JP | 2005-263097 | 9/2005 |
| KR | 10-2011-0037441 A | 4/2011 |
| KR | 10-2013-0066373 A | 6/2013 |

* cited by examiner

Primary Examiner — Marthe Marc-Coleman
(74) Attorney, Agent, or Firm — Sherr & Jiang, PLLC

(57) ABSTRACT

Disclosed are an automobile and a method of controlling an automobile, capable of deploying an airbag at an optimum time. To this end, an automobile according to a first exemplary embodiment of the present invention includes a first sensor configured to detect a relative distance and a relative velocity with respect to a front obstacle of the automobile; a second sensor configured to detect an impact signal value when the automobile collides with the obstacle; and a controller configured to change a set impact critical value by using the relative distance and the relative velocity detected by the first sensor and deploy an airbag when the impact signal value detected by the second sensor is greater than the changed impact critical value.

20 Claims, 5 Drawing Sheets

FIG. 3

| | EXPECTED IMPACT VELOCITY(km/h) | EXPECTED IMPACT TIME(ms) | WHETHER IMPACT CRITICAL VALUE IS CHANGED | COMPARISON BETWEEN IMPACT SIGNAL VALUE AND CHANGED IMPACT CRITICAL VALUE | WHETHER AIRBAG IS DEPLOYED |
|---|---|---|---|---|---|
| 1 | 23 | 90 | NOT CHANGED | - | - |
| 2 | 28 | 120 | NOT CHANGED | - | - |
| 3 | 23 | 120 | NOT CHANGED | - | - |
| 4 | 28 | 90 | CHANGED | IMPACT SIGNAL VALUE IS EQUAL TO OR LESS THAN CHANGED IMPACT CRITICAL VALUE | NOT DEPLOYE |
| 5 | 28 | 90 | CHANGED | IMPACT SIGNAL VALUE IS GREATER THAN CHANGED IMPACT CRITICAL VALUE | DEPLOYED |

AUTOMOBILE AND METHOD OF CONTROLLING AUTOMOBILE

CROSS-REFERENCE TO RELATED APPLICATIONS

The present application claims priority to Korean Patent Application Number 10-2012-0135540 filed Nov. 27, 2012 and Korean Patent Application Number 10-2012-0153440 filed Dec. 26, 2012, the entire contents of which the application is incorporated herein for all purposes by this reference.

TECHNICAL FIELD

The present invention relates to an automobile and a method of controlling an automobile, and more particularly, to an automobile and a method of controlling an automobile in which an airbag is installed.

BACKGROUND

In general, various types of safety devices are provided in an automobile in order to protect passengers when a collision accident occurs. A representative example is an airbag that is inflated by gas so as to produce a cushion force for protecting the passengers.

After a controller such as an electronic control unit (ECU) and an airbag control unit (ACU) determines whether or not an automobile collision occurs by using a signal outputted from an impact detection sensor that detects an automobile collision, the controller carries out a safing logic operation to deploy the airbag when the controller determines that the automobile collision is so serious that the airbag needs to be deployed.

The safing logic operation is a logic operation that is performed when an output of a sensor exceeds a set minimum value in order to check whether or not the automobile collision actually occurs. With respect to the existing safing logic operation, there are the first case in which the safing logic operation is performed when an output value of a main sensor provided at the controller is equal to or greater than a set critical value, and the second case in which the safing logic operation is performed when an output value of the impact detection sensor is equal to or greater than a set critical value.

However, because the existing safing logic operation is performed after the automobile collision occurs even though any one of the two cases is applicable, there is likelihood that the deployment time of the airbag may be delayed.

SUMMARY

The present invention has been made in an effort to provide an automobile and a method of controlling an automobile, capable of deploying an airbag at an optimum time.

Objects of the present invention are not limited to the objects described above, and other objects that are not described will be clearly understood by a person skilled in the art from the description below.

A first exemplary embodiment of the present invention provides an automobile including: a first sensor configured to detect a relative distance and a relative velocity with respect to a front obstacle of the automobile; a second sensor configured to detect an impact signal value when the automobile collides with the obstacle; and a controller configured to change a set impact critical value by using the relative distance and the relative velocity detected by the first sensor, and deploy an airbag when the impact signal value detected by the second sensor is greater than the changed impact critical value.

A second exemplary embodiment of the present invention provides an automobile including: a first sensor configured to detect a relative distance and a relative velocity with respect to a front obstacle of the automobile; a second sensor configured to detect an impact signal value when the automobile collides with the obstacle; and a controller configured to control an airbag by using the relative distance and the relative velocity detected by the first sensor and the impact signal value detected by the second sensor, in which the second sensor includes a front impact sensor disposed at a front side of the automobile to detect a first impact signal value, and a main sensor provided at the controller to detect a second impact signal value, and the controller changes a set first impact critical value by using the relative distance and the relative velocity detected by the first sensor, changes a set second impact critical value when the first impact signal value detected by the front impact sensor is greater than the changed first impact critical value, and deploys the airbag when the second impact signal value detected by the main sensor is greater than the changed second impact critical value.

In addition, a method of controlling an automobile according to the first exemplary embodiment of the present invention includes: detecting a relative distance and a relative velocity with respect to a front obstacle of the automobile; changing a set impact critical value by using the detected relative distance and relative velocity; detecting an impact signal value when the automobile collides with the obstacle; and deploying an airbag when the detected impact signal value is greater than the changed impact critical value.

In addition, a method of controlling an automobile according to the second exemplary embodiment of the present invention includes: detecting a relative distance and a relative velocity with respect to a front obstacle of the automobile; changing a set first impact critical value by using the detected relative distance and the detected relative velocity; detecting a first impact signal value and a second impact signal value when the automobile collides with the obstacle; changing a set second impact critical value when the detected first impact signal value is greater than the changed first impact critical value; and deploying an airbag when the detected second impact signal value is greater than the changed second impact critical value.

Details of other exemplary embodiments are included in the detailed description and the drawings.

In the automobile according to the exemplary embodiments of the present invention, the relative distance and the relative velocity with respect to the obstacle are detected before the collision with the front obstacle occurs, the set impact critical value is changed by using the detected relative distance and relative velocity, and thereafter the airbag is deployed when the impact signal value detected when the collision with the obstacle occurs is greater than the changed impact critical value. Therefore, the airbag may be deployed at an optimum time.

The effects of the present invention are not limited to the effects described above, and a person of ordinary skill in the art will clearly understand other effects that are not described from the description of the scope of the claims.

BRIEF DESCRIPTION OF THE DRAWINGS

FIG. 3 is a view illustrating whether an impact critical value is changed and whether an airbag is deployed, in the automobile according to the first exemplary embodiment of the present invention.

DETAILED DESCRIPTION

Figure 1:
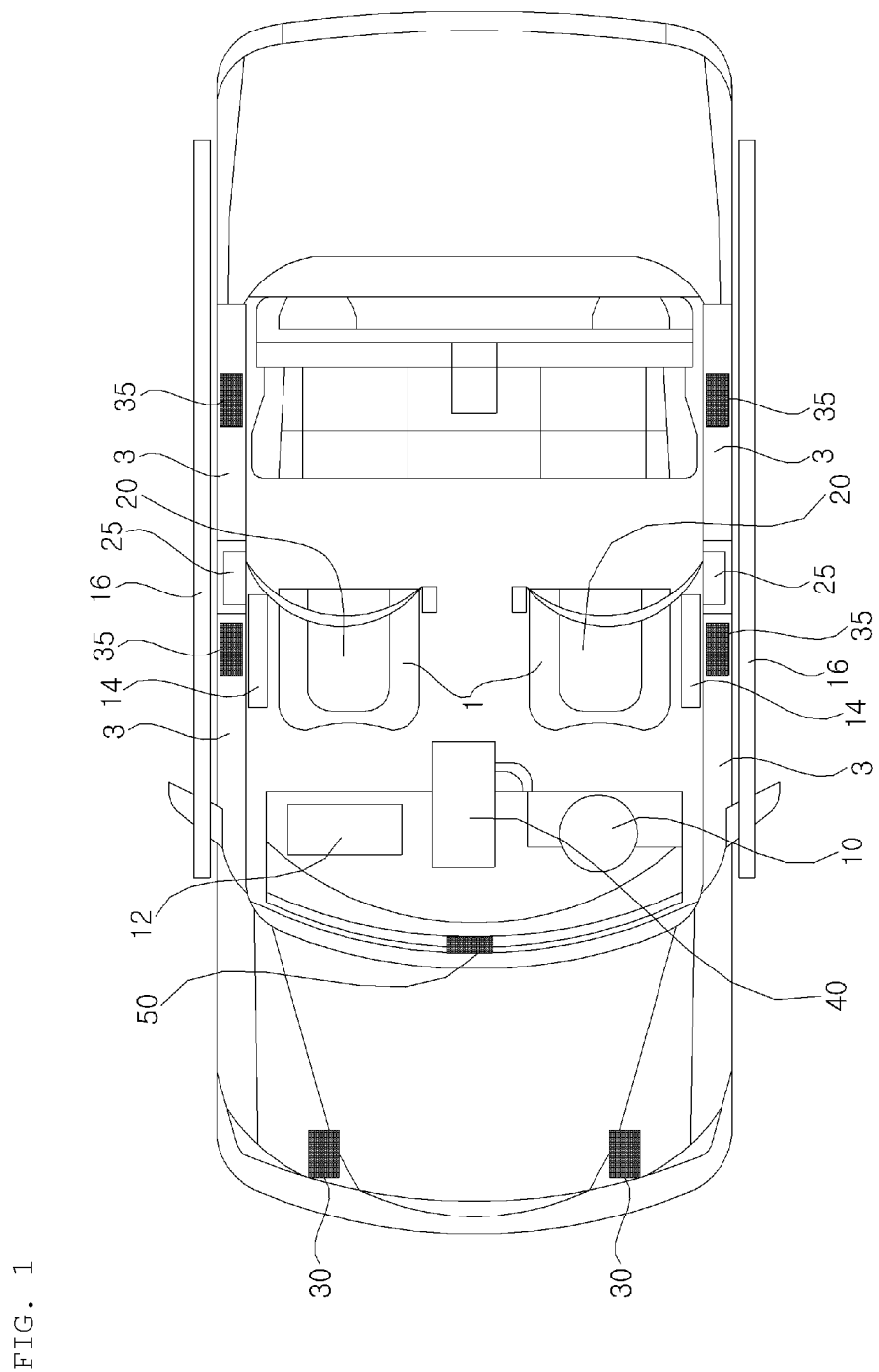
FIG. 1 is a view illustrating an automobile according to a first exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals represent like elements throughout the specification.

Hereinafter, an automobile according to exemplary embodiments of the present invention will be described with respect to the drawings.

FIG. 1 is a view illustrating an automobile according to a first exemplary embodiment of the present invention.

Referring to FIG. 1, an automobile according to the first exemplary embodiment of the present invention includes a plurality of airbags 10, 12, 14 and 16 to protect passengers sitting on a seat 1 when a collision accident occurs. Further, in order to operate the plurality of airbags 10, 12, 14 and 16, the automobile includes a plurality of impact detection sensors 30 and 35, which detects an impact signal value when an automobile collision occurs, and a controller 40 to control at least one of the plurality of airbags 10, 12, 14 and 16 by using at least one of signals outputted from the plurality of impact detection sensors 30 and 35.

The plurality of airbags 10, 12, 14 and 16 includes a driver airbag 10 mounted in a steering wheel (not illustrated) to protect a driver, a passenger seat airbag 12 mounted at an upper side of a glove box (not illustrated) to protect a passenger, side airbags 14 disposed at side doors 3 of the seat 1 to protect sides of the passenger, and curtain airbags 16 mounted at sides of a roof panel (not illustrated) to protect a head portion of the passenger and configured to be deployed between the side door 3 and the passenger.

The plurality of impact detection sensors 30 and 35 is installed at each portion of the automobile to detect impact positions of the automobile, and includes front impact sensors 30 installed at a front side of the automobile to detect an impact value or an acceleration value which is applied to an automobile body when the collision accident occurs, and side impact sensors 35 installed at the side doors 3 of the automobile to detect the impact value or the acceleration value which is applied to the automobile body when the collision accident occurs.

Two front impact sensors 30 are provided so as to be installed at a front left side and a front right side of the automobile, respectively, and four side impact sensors 35 are provided so that two side impact sensors 35 are installed at left and right sides of the side doors 3 of the automobile, respectively.

The controller 40 controls the airbags 10, 12, 14 and 16 by using the impact signal values detected by the impact detection sensors 30 and 35 when the automobile collision occurs.

The controller 40 may be a typical airbag control unit (ACU) that is installed in the automobile to control the airbags 10, 12, 14 and 16, or may be an electronic control unit (ECU) that is a representative control device of the automobile and has a function of the airbag control unit.

In a case of a head-on collision of the automobile, the front impact sensor 30 detects the impact signal value, and then the controller 40 controls the airbags 10 and 12 by using the impact signal value detected by the front impact sensor 30.

Of course, in a case of a side collision of the automobile, the side impact sensor 35 detects the impact signal value, and then the controller 40 controls the airbags 14 and 16 by using the impact signal value detected by the side impact sensor 35.

That is, when the controller 40 uses the impact signal value to control the airbags 10, 12, 14 and 16, the airbags 10 and 12 are deployed as the controller 40 determines the head-on collision of the automobile through the impact signal value detected by the front impact sensor 30 in the case of the head-on collision of the automobile, and the airbags 14 and 16 are deployed as the controller 40 determines the side collision of the automobile through the impact signal value detected by the side impact sensor 35 in case of the side collision of the automobile.

Meanwhile, seat belts 20 are further installed in the automobile to secure the passengers sitting on the seats 1 against the seats 1. In the case of the head-on collision of the automobile, the passenger sitting on the seat 1 receives kinetic energy that causes a head of the passenger to be bent forward and causes the entire body of the passenger to be moved forward. In this case, the controller 40 controls a seat belt retractor 25 so that the seat belt retractor 25 winds the seat belt 20 to prevent the passenger sitting on the seat 1 from being moved forward when the controller 40 determines the head-on collision of the automobile.

However, if the airbags 10 and 12 are not deployed at an appropriate time or the seat belt retractor 25 does not wind the seat belt 20 at an appropriate time in the case of the head-on collision of the automobile, the passenger sitting on the seat 1 is moved forward while being moved away from the seat 1 and may have a serious injury while colliding with a crash pad that is a structure disposed at a front side.

Therefore, a first sensor 50 is further installed at a wind shield that is a front glass of a room of the automobile so that the airbags 10 and 12 may be deployed at an appropriate time in the case of the head-on collision of the automobile. The first sensor 50 includes a radar, a lidar (light detection and ranging), or a camera that may detect a relative distance and a relative velocity with respect to a front obstacle (for example, a preceding automobile) of the automobile.

Figure 2:
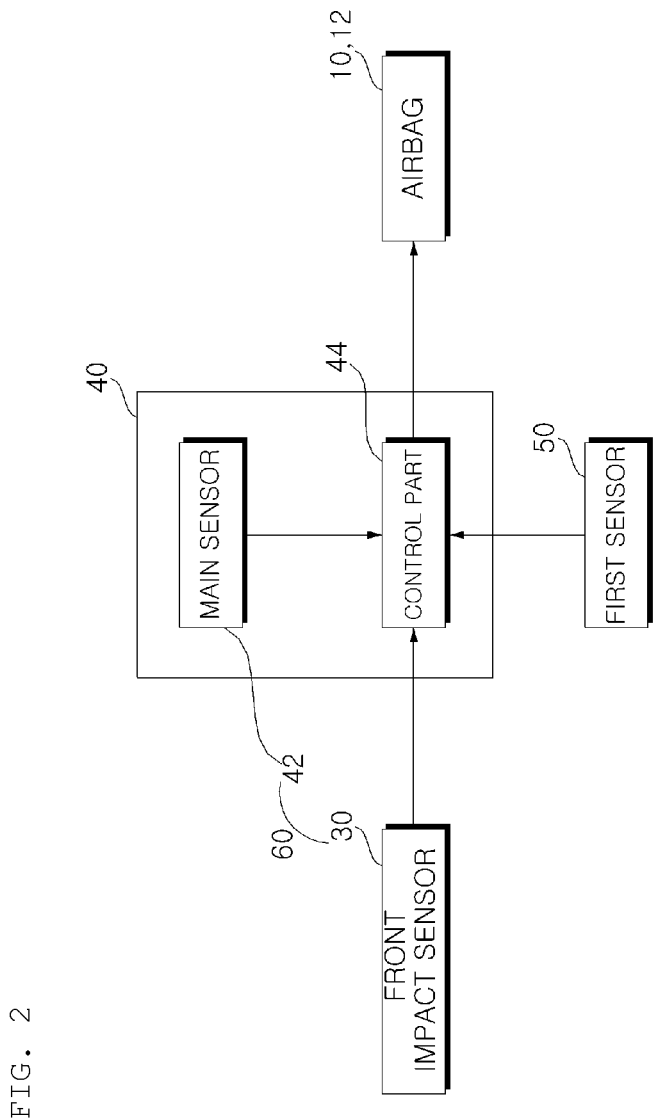
FIG. 2 is a control block diagram of the automobile according to the first exemplary embodiment of the present invention.

FIG. 2 is a control block diagram of the automobile according to the first exemplary embodiment of the present invention.

Referring to FIGS. 1 and 2, the controller 40 may have a main sensor 42 that detects the impact signal value when the automobile collision occurs. In this case, the controller 40 controls the plurality of airbags 10, 12, 14 and 16 at a control part 44 by using one of the impact signal value detected by the impact detection sensors 30 and 35 and the impact signal value detected by the main sensor 42.

The main sensor 42 detects an acceleration value transmitted from the automobile body when the automobile collision accident occurs. Therefore, the impact signal value detected when the automobile collision accident occurs may be the impact value or the acceleration value detected by the impact detection sensors 30 and 35, or the acceleration value detected by the main sensor 42, and the control part 44 of the controller 40 uses the impact value or the acceleration value detected by the impact detection sensors 30 and 35, or the acceleration value detected by the main sensor 42, to control at least one of the plurality of airbags 10, 12, 14 and 16 so as to be deployed.

As described above, the first sensor 50 is a sensor that detects the relative distance and the relative velocity with respect to the front obstacle of the automobile before the automobile collision occurs, and the impact detection sensors 30 and 35 and the main sensors 42 are sensors that detect the impact signal value after the automobile collision occurs.

Hereinafter, the front impact sensor 30 or the main sensor 42, which is a sensor that detects the impact signal value in the case of the head-on collision of the automobile, is referred to as a second sensor 60, and a method of controlling the airbags 10 and 12 in the case of the head-on collision of the automobile will be described in detail.

The first sensor 50 detects the relative distance and the relative velocity with respect to the front obstacle of the automobile before the automobile collision occurs, and the second sensor 60 detects the impact signal value when the automobile collides with the obstacle.

The controller 40 controls the airbags 10 and 12 by using the relative distance and the relative velocity detected by the first sensor 50 before the automobile collision occurs and the impact signal value detected by the second sensor 60 when the automobile collision occurs.

That is, the controller 40 changes a set impact critical value by using the relative distance and relative velocity detected by the first sensor 50 before the automobile collision occurs, compares the impact signal value detected by the second sensor 60 when the automobile collision occurs, to the changed impact critical value, and deploys the airbags 10 and 12 when the impact signal value is greater than the changed impact critical value.

The controller 40 calculates an expected impact time TTC (Time To Crash) and an expected impact velocity Vc of the automobile by using the relative distance and relative velocity detected by first sensor 50, and thereafter may change the set impact critical value when the calculated expected impact time TTC is less than a period of receiving data regarding the relative distance and relative velocity from the first sensor 50, and the calculated expected impact velocity Vc is greater than a set velocity.

The controller 40 may calculate the relative velocity when the relative distance is zero as the expected impact velocity Vc, and may calculate a value obtained by dividing the relative distance by the relative velocity as the expected impact time TTC, by putting together the data regarding the relative distance and the relative velocity transmitted from the first sensor 50.

Because the controller 40 only needs to change the impact critical value immediately before the automobile collision occurs, as long as the controller 40 is secured to receive the data regarding the relative distance and the relative velocity from the first sensor 50 before the automobile collision occurs. The controller 40 preferably changes the impact critical value in a case in which the calculated expected impact time TTC is less than a period of receiving the data regarding the relative distance and the relative velocity from the first sensor 50, without changing the impact critical value in advance. In addition, the controller 40 preferably changes the impact critical value in a case in which the expected impact velocity Vc is greater than the set velocity at which the airbags 10 and 12 need to be deployed.

In the present exemplary embodiment, the expected impact velocity Vc at which the airbag needs to be deployed is set in advance to 24 km/h at the controller 40. In addition, the period in which the first sensor 50 transmits the data regarding the relative velocity and the relative distance to the controller 40 is 100 ms. Therefore, the controller 40 changes the set impact critical value in a case in which the calculated expected impact velocity Vc is greater than 24 km/h, and the calculated expected impact time TTC is less than 100 ms. The description regarding this will be made with reference to FIG. 3.

FIG. 3 is a view illustrating whether the impact critical value is changed and whether the airbag is deployed, in the automobile according to the first exemplary embodiment of the present invention.

Referring to FIG. 3, in a first case, the expected impact velocity Vc is 23 km/h and the expected impact time TTC is 90 ms. Here, because the expected impact time TTC of 90 ms is less than 100 ms that is the period in which the first sensor 50 transmits the data regarding the relative distance and the relative velocity to the controller 40, the condition that the set impact critical value is changed is satisfied, but because the expected impact velocity Vc of 23 km/h is less than 24 km/h set at the controller 40, the condition that the set impact critical value is changed is not satisfied. Therefore, the controller 40 does not change the set impact critical value.

In a second case, the expected impact velocity Vc is 28 km/h and the expected impact time TTC is 120 ms. Here, because the expected impact velocity Vc of 28 km/h is greater than 24 km/h set at the controller 40, the condition that the set impact critical value is changed is satisfied, but because the expected impact time TTC of 120 ms is greater than 100 ms that is the period in which the first sensor 50 transmits the data regarding the relative distance and the relative velocity to the controller 40, the condition that the set impact critical value is changed is not satisfied. Therefore, the controller 40 does not change the set impact critical value.

In a third case, the expected impact velocity Vc is 23 km/h and the expected impact time TTC is 120 ms. Here, because the expected impact velocity Vc of 23 km/h is less than 24 km/h set at the controller 40, the condition that the set impact critical value is changed is not satisfied, and because the expected impact time TTC of 120 ms is greater than 100 ms that is the period in which the first sensor 50 transmits the data regarding the relative distance and the relative velocity to the controller 40, the condition that the set impact critical value is changed is not satisfied. Therefore, the controller 40 does not change the set impact critical value.

In a fourth case, the expected impact velocity Vc is 28 km/h and the expected impact time TTC is 90 ms. Here, because the expected impact velocity Vc of 28 km/h is greater than 24 km/h set at the controller 40, the condition that the set impact critical value is changed is satisfied, and because the expected impact time TTC of 90 ms is less than 100 ms that is the period in which the first sensor 50 transmits the data regarding the relative distance and the relative velocity to the controller 40, the condition that the set impact critical value is changed is satisfied. Therefore, after the controller 40 changes the set impact critical value, the controller 40 compares the impact signal value, which is transmitted from the second sensor 60 when the automobile collision occurs, to the changed impact critical value, and does not deploy the airbags 10 and 12 when the impact signal value is equal to or less than the changed impact critical value.

A fifth case is the same as the fourth case. However, in the fifth case, the impact signal value transmitted from the second sensor 60 when the automobile collision occurs is greater than the changed impact critical value, and thus the controller 40 deploys the airbags 10 and 12.

Of course, when the impact signal value detected by the second sensor 60 is greater than the changed impact critical value, the controller 40 deploys the airbags 10 and 12 and controls the seat belt retractor 25 so that the seat belt retractor 25 winds the seat belt 20.

Figure 4:
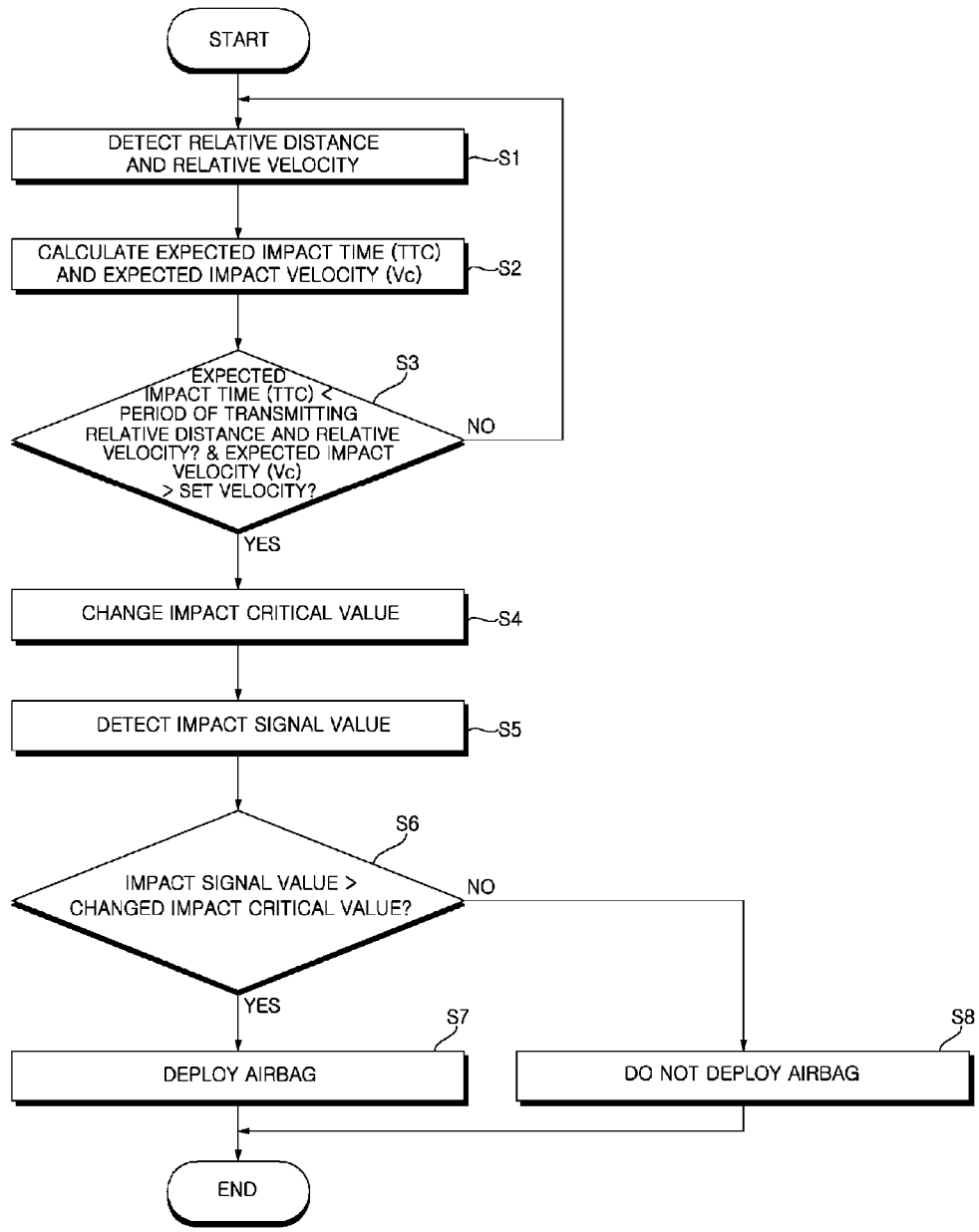
FIG. 4 is a flow chart illustrating a method of controlling the automobile according to the first exemplary embodiment of the present invention.

FIG. 4 is a flow chart illustrating a method of controlling the automobile according to the first exemplary embodiment of the present invention. Here, the description will be made in connection with the aforementioned operation of the automobile according to the first exemplary embodiment of the present invention.

Referring to FIG. 4, the first sensor 50 detects the relative distance and the relative velocity with respect to the front obstacle during driving of the automobile (S1).

Thereafter, the controller 40 calculates the expected impact time TTC and the expected impact velocity Vc by using the relative distance and relative velocity transmitted from the first sensor 50 (S2).

Thereafter, the controller 40 determines whether the calculated expected impact time TTC is less than a period of receiving the data regarding the relative distance and the relative velocity from the first sensor 50 and whether the calculated expected impact velocity Vc is greater than the set velocity (S3).

Thereafter, the controller 40 changes the impact critical value that is set in advance in order to deploy the airbags 10 and 12 when the calculated expected impact time TTC is less than the period of receiving the data regarding the relative distance and the relative velocity from the first sensor 50, and the calculated expected impact velocity Vc is greater than the set velocity (S4).

Thereafter, when the automobile collision occurs, the second sensor 60 detects the impact signal value (S5).

Thereafter, the controller 40 determines whether the impact signal value transmitted from the second sensor 60 is greater than the changed impact critical value (S6).

Thereafter, the controller 40 deploys the airbags 10 and 12 when the impact signal value transmitted from the second sensor 60 is greater than the changed impact critical value (S7). Of course, when the impact signal value transmitted from the second sensor 60 is greater than the changed impact critical value, the controller 40 controls the seat belt retractor 25 so that the seat belt retractor 25 winds the seat belt 20. If the impact signal value transmitted from the second sensor 60 is equal to or less than the changed impact critical value, the controller 40 does not deploy the airbags 10 and 12 (S8).

Meanwhile, in the aforementioned automobile according to the first exemplary embodiment of the present invention, the second sensor 60 includes only one of the front impact sensor 30 and the main sensor 42. However, in an automobile according to a second exemplary embodiment of the present invention, the second sensor 60 includes both of the front impact sensor 30 and the main sensor 42.

That is, the automobile according to the second exemplary embodiment of the present invention is different from that of the first exemplary embodiment in that the second sensor 60, which is a sensor that detects an collision as illustrated in FIGS. 1 and 2, includes both of the front impact sensor 30 and the main sensor 42. Because the other components are the same as those of the first exemplary embodiment, a detailed description regarding the same components will be omitted, and only the different points will be described.

Referring to FIGS. 1 and 2, in the automobile according to the second exemplary embodiment of the present invention, the first sensor 50 detects a relative distance and a relative velocity with respect to the front obstacle before the automobile collision occurs. Furthermore, after the automobile collision occurs, the front impact sensor 30 detects a first impact signal value, and the main sensor 42 detects a second impact signal value.

The controller 40 changes a set first impact critical value by using the relative distance and the relative velocity detected by the first sensor 50, changes a set second impact critical value when the first impact signal value detected by the front impact sensor 30 is greater than the changed first impact critical value, and deploys the airbags 10 and 12 when the second impact signal value detected by the main sensor 42 is greater than the changed second impact critical value.

The controller 40 calculates an expected impact time and an expected impact velocity of the automobile by using the relative distance and the relative velocity detected by the first sensor 50, and then changes the set first impact critical value when the calculated expected impact time is less than a period of receiving the relative distance and the relative velocity from the first sensor 50, and the calculated expected impact velocity is greater than the set velocity.

When the second impact signal value detected by the main sensor 42 is greater than the changed second impact critical value, the controller 40 deploys the airbags 10 and 12, and controls the seat belt retractor 25 so that the seat belt retractor 25 may wind the seat belt 20.

Figure 5:
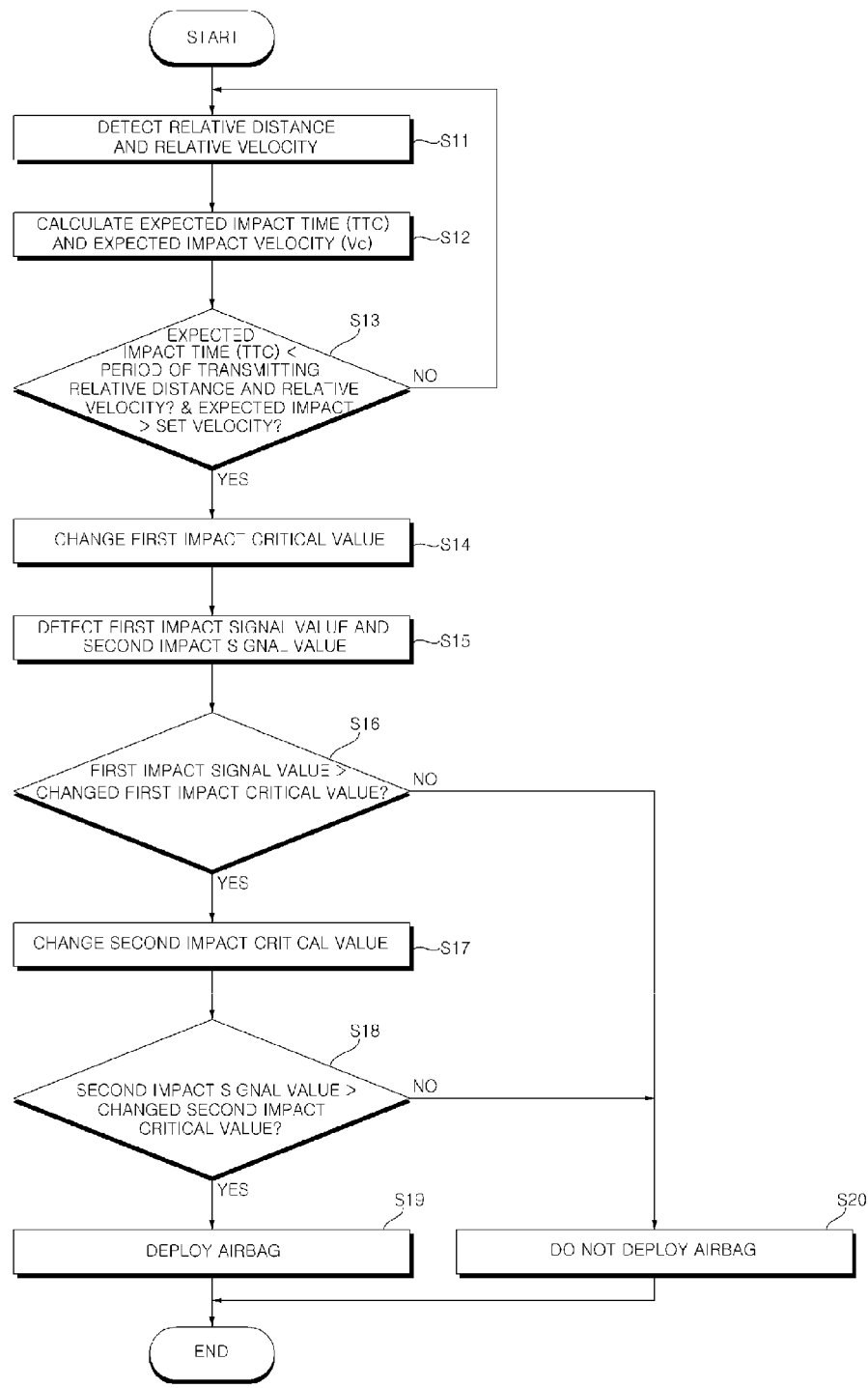
FIG. 5 is a flow chart illustrating a method of controlling an automobile according to a second exemplary embodiment of the present invention.

FIG. 5 is a flow chart illustrating a method of controlling the automobile according to the second exemplary embodiment of the present invention. Here, the description will be made in connection with the aforementioned operation of the automobile according to the second exemplary embodiment of the present invention.

Referring to FIG. 5, the first sensor 50 detects the relative distance and the relative velocity with respect to the front obstacle during driving of the automobile (S11).

Thereafter, the controller 40 calculates the expected impact time TTC and the expected impact velocity Vc by using the relative distance and the relative velocity transmitted from the first sensor 50 (S12).

Thereafter, the controller 40 determines whether the calculated expected impact time TTC is less than the period of receiving the data regarding the relative distance and the relative velocity from the first sensor 50 and whether the calculated expected impact velocity Vc is greater than the set velocity (S13).

Thereafter, the controller 40 changes the first impact critical value that is set in advance, when the calculated expected impact time TTC is less than the period of receiving the data regarding the relative distance and the relative velocity from the first sensor 50, and the calculated expected impact velocity Vc is greater than the set velocity (S14).

Thereafter, when the automobile collision occurs, the front impact sensor 30 detects the first impact signal value, and the main sensor 42 detects the second impact signal value (S15).

Thereafter, the controller 40 determines whether the first impact signal value transmitted from the front impact sensor 30 is greater than the changed first impact critical value (S16).

Thereafter, when the first impact signal value transmitted from the front impact sensor 30 is greater than the changed first impact critical value, the controller 40 changes the second impact critical value that is set in advance in order to deploy the airbags 10 and 12 (S17). If the first impact signal value transmitted from the front impact sensor 30 is equal to or less than the changed first impact critical value, the controller 40 does not deploy the airbags 10 and 12 (S20).

Thereafter, the controller 40 determines whether the second impact signal value transmitted from the main sensor 42 is greater than the changed second impact critical value (S18).

Thereafter, when the second impact signal value transmitted from the main sensor 42 is greater than the changed second impact critical value, the controller 40 deploys the airbags 10 and 12 (S19). Of course, when the second impact signal value transmitted from the main sensor 42 is greater than the changed second impact critical value, the controller 40 controls the seat belt retractor 25 so that the seat belt retractor 25 winds the seat belt 20. If the second impact signal value transmitted from the main sensor 42 is equal to or less than the changed second impact critical value, the controller 40 does not deploy the airbags 10 and 12 (S20).

As described above, in the automobile according to the exemplary embodiments of the present invention, the relative distance and the relative velocity with respect to the obstacle are detected before the collision with the front obstacle occurs, the set impact critical value is changed by using the detected relative distance and relative velocity, and then the airbags 10 and 12 are deployed when the impact signal value detected when the collision with the obstacle occurs is greater than the changed impact critical value. Therefore, the airbags 10 and 12 may be deployed at an optimum time.

Those skilled in the art will appreciate that the present invention can be implemented in other detailed embodiments, without departing from the technical spirit and essential features of the invention. Therefore, it should be understood that the above-described embodiments are only illustrative in all aspects, not restrictive. The scope of the present invention should be defined by the accompanying claims rather than the detailed description. Various modifications, additions and substitutions derived from the meaning and scope of the accompanying claims and equivalent concept thereof should be interpreted as being included in the scope of the present invention.

What is claimed is:

1. An automobile comprising:
a first sensor configured to detect a relative distance and a relative velocity with respect to a front obstacle of the automobile;
a second sensor configured to detect an impact signal value when the automobile collides with the obstacle; and
a controller configured to change a predetermined impact critical value by using the relative distance and the relative velocity detected by the first sensor and compare the impact signal value with the changed impact critical value, determine whether to deploy an airbag based on the comparing result.

2. The automobile of claim 1, wherein the controller calculates an expected impact time and an expected impact velocity of the automobile by using the relative distance and the relative velocity, and then changes the predetermined impact critical value in comparison of the calculated expected impact time and a period of receiving the relative distance and the relative velocity.

3. The automobile of claim 1, wherein the first sensor is a radar, a lidar, or a camera.

4. The automobile of claim 1, wherein the second sensor is a front impact sensor disposed at a front side of the automobile or a main sensor provided at the controller.

5. The automobile of claim 1, further comprising:
a seat belt retractor which is controlled by the controller so as to wind a seat belt when the impact signal value detected by the second sensor is greater than the changed impact critical value.

6. The automobile of claim 1, wherein the controller calculates an expected impact time and an expected impact velocity of the automobile by using the relative distance and the relative velocity, and then changes the predetermined impact critical value in comparison of the calculated expected impact velocity and a predetermined velocity.

7. A method of controlling an automobile, comprising:
detecting by a first sensor a relative distance and a relative velocity with respect to a front obstacle of the automobile;
changing by a controller a predetermined impact critical value by using the detected relative distance and relative velocity;
detecting by a second sensor an impact signal value when the automobile collides with the obstacle;
comparing by the controller the impact signal value with the changed impact critical value; and
determining by the controller whether to deploy an airbag based on the comparing result.

8. The method of claim 7, wherein in the changing of the predetermined impact critical value, an expected impact time and an expected impact velocity of the automobile are calculated by using the detected relative distance and relative velocity, and then the predetermined impact critical value is changed in comparison of the calculated expected impact time and a period of transmitting the relative distance and the relative velocity.

9. The method of claim 7, wherein the impact signal value is an impact value or an acceleration value.

10. The method of claim 7, wherein, in the deploying of the airbag, the airbag is deployed and a seat belt is wound when the detected impact signal value is greater than the changed impact critical value.

11. The method of claim 7, wherein in the changing of the predetermined impact critical value, an expected impact time and an expected impact velocity of the automobile are calculated by using the detected relative distance and relative velocity, and then the predetermined impact critical value is changed, in comparison of the calculated expected impact velocity and a predetermined velocity.

12. An automobile comprising:
a first sensor configured to detect a relative distance and a relative velocity with respect to a front obstacle of the automobile;
a second sensor configured to detect an impact signal value when the automobile collides with the obstacle; and
a controller configured to change a predetermined impact critical value by using the relative distance and the relative velocity detected by the first sensor, and compare the impact signal value with the changed impact critical value, determine whether to control a seat belt retractor based on the comparing result.

13. The automobile of claim 12, wherein the controller calculates an expected impact time and an expected impact velocity of the automobile by using the relative distance and the relative velocity , and then changes the predetermined impact critical value in comparison of the calculated expected impact time and a period of receiving the relative distance and the relative velocity.

14. The automobile of claim 12, wherein the controller calculates an expected impact time and an expected impact velocity of the automobile by using the relative distance and the relative velocity , and then changes the predetermined impact critical value in comparison of the calculated expected impact velocity and a predetermined velocity.

15. The automobile of claim 12, wherein the first sensor is a radar, a lidar, or a camera.

16. The automobile of claim 12, wherein the second sensor is a front impact sensor disposed at a front side of the automobile or a main sensor provided at the controller.

17. A method of controlling an automobile, comprising:
- detecting by a first sensor a relative distance and a relative velocity with respect to a front obstacle of the automobile;
- changing by a controller a predetermined impact critical value by using the detected relative distance and relative velocity;
- detecting by a second sensor an impact signal value when the automobile collides with the obstacle;
- comparing by the controller the impact signal value with the changed impact critical value; and
- determining by the controller whether to control a seat belt retractor based on the comparing result.

18. The method of claim 17, wherein in the changing of the predetermined impact critical value, an expected impact time and an expected impact velocity of the automobile are calculated by using the detected relative distance and relative velocity, and then the predetermined impact critical value is changed in comparison of the calculated expected impact time and a period of transmitting the relative distance and the relative velocity.

19. The method of claim 18, wherein in the changing of the predetermined impact critical value, an expected impact time and an expected impact velocity of the automobile are calculated by using the detected relative distance and relative velocity, and then the predetermined impact critical value is changed in comparison of the calculated expected impact velocity and a predetermined velocity.

20. The method of claim 19, wherein the impact signal value is an impact value or an acceleration value.

* * * * *